United States Patent Office 3,635,932
Patented Jan. 18, 1972

3,635,932
PROCESS OF SEPARATING MICROGEL FROM RUBBER POLYMERS
Norman F. Keckler, Canton, Ohio, assignor to The Firestone Tire & Rubber Company, Akron, Ohio
No Drawing. Continuation-in-part of application Ser. No. 505,043, Oct. 24, 1965. This application May 1, 1969, Ser. No. 821,153
Int. Cl. C08d 3/08, 5/00
U.S. Cl. 260—94.7 R    3 Claims

ABSTRACT OF THE DISCLOSURE

The invention relates to polymers, both (1) homopolymers of hydrocarbon conjugated-diene monomers of 4 and 5 carbon atoms and (2) copolymers of said monomers with aliphatic or aryl olefinic monomers produced by solution polymerization using a lithium-containing catalyst, with production of microgel. The microgel is separated by centrifuging a solution of the polymer product in a solvent of different density from the microgel.

---

This application is a continuation-in-part of my application Ser. No. 505,043 filed Oct. 24, 1965.

In certain solution polymerization processes, microgel is formed which is objectionable in rubber polymers which are to be used for certain purposes, as in the manufacture of plastics, etc. This invention relates to the treatment of such polymer solutions to render the microgel separable by centrifugation, and then centrifuging these solutions to remove at least a substantial part of the microgel.

Microgel particles are polymers which either have a substantially higher molecular weight than the polymers dissolved in the solvent which is employed, or polymers which are substantially more highly cross linked than the dissolved polymers. The microgel particles are swollen by the solvent but are not completely soluble in it.

So far as known, attempts to remove the microgel from the solutions produced in the polymerization process by centrifugation have proven unsuccessful. However, by any one of the treatments disclosed herein, these solutions are brought to a condition which permits microgel separation by centrifuging.

Microgel is formed in the solution polymerization of hydrocarbon diene monomers of 4 and 5 carbon atoms (e.g., butadiene, isoprene and piperylene) and copolymers of such monomers with aliphatic and aryl olefinic monomers (e.g., styrene, alkyl styrenes, vinyl toluene, lower alkyl esters of acrylic and methacrylic acids, including methyl acrylate, ethyl acrylate, methyl methacrylate, ethyl methacrylate, etc., acrylonitrile and divinylbenzene, etc.), as for example, in the production of rubbers such as polybutadiene as described in British Pat. 817,693 and butadiene-styrene copolymer with relatively uniformly positioned butadiene and styrene units made with lithium-based catalysts as described in French Pat. 1,369,589. Details of such polymerizations are not disclosed herein because they are in the prior art.

It is not possible to separate microgel by centrifuging the polymer solutions resulting from such commercial production procedures because the solutions contain such a high solids content that they are too viscous to effect microgel separation by centrifuging. In order to accomplish centrifugal separation the solutions must have a viscosity not greater than 15,000 centipoises. Furthermore, the difference between the density of the microgel particles and the density of the polymer solution in which they are suspended must be sufficient to permit centrifugal separation. Although generally the microgel will be heavier than the solution, it is possible that the solution may be heavier than the microgel particles.

If the microgel is in a polymer solution in which it is so insoluble that it dissolves little solvent, and the density of the microgel is substantially greater than that of the polymer solution (as, for example, the microgel in a solution of polybutadiene in pentane or butadiene-styrene copolymer in hexane), the solution produced in the polymerization need only be diluted with the solvent employed. Microgel can be centrifuged from polymer solutions resulting from polymerization in other lower alkanes such as the butanes, propanes, etc. by mere dilution.

Polybutadiene and butadiene-styrene copolymer, etc. are more soluble in the higher molecular-weight alkanes, and so much solvent is dissolved in the microgel that there is so little difference in the densities of the microgel particles and the polymer solutions that the microgel particles cannot be separated from such solutions by centrifugation. But microgel particles can be centrifuged from polymer solutions in such higher alkanes if they are diluted with a poorer solvent for the polymer involved, preferably one in which the microgel is less soluble, such as, for example, the pentanes, the butanes, and solutions containing a small amount of methyl or other alcohol, acetic or other carboxylic acids, acetonitrile or even water, etc. Such non-solvents or poor solvents must not be added in such amount as to cause phase separation during agitation.

If, on the other hand, the added solvent is a better solvent for the microgel than the solvent used in the polymerization, prompt centrifugation is desirable. Thus, if hexane is added to a pentane solution of polybutadiene containing microgel, the hexane will swell the microgel, if allowed to stand, and the density of the microgel will become more and more like the density of the mixed solvents until equilibrium is established. Thus, prompt centrifugation at these conditions, before the microgel particles swell in the improved solvent, permits centrifugal separation of the microgel particles.

The described polymers, and other polymers, have been dissolved in monomers which are then polymerized. Unless the microgel particles are removed they cause so-called "fish eyes" in the final polymer product which are undesirable and detract from the value of this final product. The monomers in which the polymers are dissolved include styrene, vinyl toluene, alpha-methyl styrene, acrylates, methacrylates, acrylonitrile, vinyl chloride, vinylidene chloride and blends thereof. The ratio of the polymer to the monomer may vary. If the monomer is styrene, for instance, by adding 1 to 15 percent (or prferably 5 to 10 percent) of polybutadiene to the styrene a modified polystyrene is produced which has improved impact properties and other desirable properties such as improved low-temperature properties. Separation of microgel particles from a solution of the polybutadiene in styrene or other good solvent is difficult due to the excellent solvency of styrene for polybutadiene and the small difference in the density of polybutadiene and styrene. To obtain separation by centrifugation, a miscible solvent which is either a poor solvent or one of significantly different density from the polymer solution is added to this solution (e.g. butane, pentane, hexane, cyclohexane, etc.). Centrifugation is carried out prior to equilibrium between the added solvent and initial polymer solution so that there is a density gradient between the microgel particles and this solution. Centrifugation is then carried out as previously described. Normally, the added solvent is removed before the polymerization process is completed.

Thus, the solvent added to the microgel-containing solution of the polymer must not swell the microgel, it must reduce the viscosity of the polymer solution to less than about 15,000 centipoises, and at the time of centrifuging the difference in density of the microgel particles and the polymer solution must be sufficient to effect separation by centrifuging, and in commercial operations such difference will usually be at least 0.05 gram per milliliter.

So long as the foregoing provisions are met, the temperature at which the solution is centrifuged is immaterial although it affects the solubility of the microgel, the viscosity of the solution and the difference in the densities of the microgel and the polymer solution. However, the figures for the viscosity and the difference in densities must be interpreted rather liberally because the required low viscosity, and more particularly the required difference in densities is affected by the speed of the centrifuge and the time of the centrifuging. In addition, the speed and duration of the centrifuging may be designed to reduce the microgel content more or less completely.

A wide choice of solvents and centrifuge speeds is available.

The following examples are illustrative of the results obtained in the laboratory using an International Size 1 Type C Centrifuge. The gel rating is an arbitrary figure selected by comparison with ten standard photographs showing the number of microgel particles within a given area. The rating is determined by dissolving the polymer with a given volume of toluene or xylene containing a dye which is absorbed by the polymer, allowing this to stand for a given period at a given temperature, and then filtering it through filter paper which retains the microgel. The amount of microgel is rated by comparing the number of particles per unit of area on this paper with the standard photographs. A rating of 1 indicates that very little microgel is present, and the higher ratings indicate the presence of increasingly larger amounts of gel.

The following experiments illustrate the invention as applied in the production of a commercial-type polybutadiene with an average molecular weight of substantially 160,000.

EXPERIMENT I

A cement obtained by polymerization of butadiene with lithium-based catalyst in pentane, after deactivation of the living polymer, and containing about 24 percent of polybutadiene (including the microgel) was centrifuged (at the rate given in the following table) before and after dilution with pentane to various percentages of solid content given in the table, and also after dilution with hexane to give solvent mixtures of the percentage content given in the table. All products were centrifuged one hour to remove microgel particles, except the control which was not centrifuged. The centrifuged solutions of polybutadiene were then treated as above described and then filtered, and the deposits compared with standard photographs to ascertain their microgel ratings, as described.

| No. | Solvent (percent) | | Total solids | Max. RCF [1] | Rating | Viscosity [2] |
|---|---|---|---|---|---|---|
| | Pentane | Hexane | | | | |
| 1 | [3] 100 | None | 24 | | 6, 8 | |
| 2 | 100 | None | 24 | 445 | 6 | 18,500 |
| 3 | 100 | None | 20 | 445 | 5 | 8,100 |
| 4 | 100 | None | 14 | 640 | 2 | 1,620 |
| 5 | 56.5 | 43.5 | 15 | 445 | 2 | 2,640 |
| 6 | 52.9 | 47.1 | 14 | 640 | 5 | [4] 1,900 |

[1] RCF = Relative Centrifugal Force (one RCF is equivalent to the force of gravity).
[2] Recorded in centipoise units in this and the following tables.
[3] Control.
[4] After equilibrium.

Solution No. 5 was centrifuged immediately after diluting with hexane, i.e. before the microgel particles were more highly swelled by hexane and therefore had the gradient density desired for centrifuging. No. 6 was allowed to stand over night and the density of these particles more closely resembled that of those formed in a hexane solution, and did not show the desired effect. The results show that a pentane solution with a solids content of substantially less than 20 percent, such as 15 percent, and the obtained density difference, is required for centrifuging at the tested RCF. Using commercial centrifuges which operate at $20,000 \times G$ or more, satisfactory results will be obtained with greater solids contents, such as about 20 percent or even higher.

EXPERIMENT II

Linear polybutadiene obtained in hexane solution by polymerization with lithium-based catalyst was diluted with hexane to 25 percent solids content to obtain the control. It was further diluted with hexane, and certain test samples were diluted with pentane also, as indicated. The various samples were centrifuged for one hour and then filtered with the following results:

| Solvent (percent) | | Total solids (percent) | Max. RCF | Rating | Viscosity |
|---|---|---|---|---|---|
| Hexane | Pentane | | | | |
| [1] 100 | None | 25 | | 8 | |
| 100 | None | 15 | 712 | 6 | 3,730 |
| 75 | 25 | 20 | 712 | 7 | 14,100 |
| 52.9 | 47.1 | 15 | 712 | 2 | 2,750 |

[1] Control.

The results indicate that no substantial practical improvement can be obtained for microgel rating, by centrifuging hexane cements. However, the dilution with pentane to 15 percent solids reduced the swelling properties of the mixed solvent sufficiently to result in a sufficient density gradient between the microgel and the polymer cement to permit satisfactory microgel removal.

EXPERIMENT III

In this experiment a hexane reaction product of polybutadiene prepared with lithium-based catalyst and having a solids content of 24 percent was used. In each test hexane was present as the sole solvent in except the one case, in which pentane was added and the ratio of the pentane to the hexane is indicated. All solutions were centrifuged one hour.

| Solvent (percent) | | Total solids (percent) | Max. RCF | Rating | Viscosity |
|---|---|---|---|---|---|
| Hexane | Pentane | | | | |
| None | [1] 100 | 24 | | 4 | |
| None | 100 | 24 | 712 | 5 | 42,000 |
| None | 100 | 14.5 | 640 | 5 | 3,100 |
| 47.7 | 52.3 | 13 | 640 | 1 | 1,345 |

[1] Control.

Although the gel rating of the control was lower than in the previous experiments, the results agree with those of the foregoing experiments because centrifuging the hexane solutions did produce a low rating, whereas when pentane was added the rating dropped decisively, again demonstrating the need for a poor solvent.

Other poor solvents may be used, such as those obtained by the addition of a small amount of water, alcohol, or other poor solvent, to hexane or benzene or other good solvent.

I claim:

1. The improvement in the method of separating solvent-swollen microgel particles derived from a rubber polymer of the class consisting of homopolymers of hydrocarbon conjugated-diene monomers of 4 and 5 carbon atoms and copolymers thereof with aliphatic and aryl olefinic monomers, which particles are present in a solution of said polymer, which solution has substantially the same density as the particles, which improvement comprises the steps of adding a miscible solvent of a significantly different density to the solution and thereby changing the density of said solution to a density sufficiently different from that of the solvent-swollen microgel particles to permit separation of said particles by centrifuging and then centrifuging prior to the occurrence of a substantial change in the density of the particles and thereby effecting a substantial reduction in the microgel content of the solution of said polymer.

2. The improved process of claim 1 in which the polymer is polybutadiene.

3. The improvement in the method of separating solvent-swollen microgel particles derived from a rubber polymer of the class consisting of homopolymers of hydrocarbon conjugated diene monomers of 4 and 5 carbon atoms and copolymers thereof with aliphatic and aryl olefinic monomers, which particles are suspended in a solution of said polymer which solution has substantially the same density as the polymer, which improvement comprises the steps of adding to the solution a miscible solvent of significantly different density from that of the solution and thereby changing the density of said solution in which the microgel particles are suspended to a density sufficiently different from that of the solvent-swollen microgel particles to permit separation of said particles from the solution in which they are suspended by centrifuging the solution, and then centrifuging prior to the occurrence of a substantial change in the density of the particles and thereby effecting a substantial reduction in the microgel content of the solution of said polymer.

References Cited
UNITED STATES PATENTS

| | | | |
|---|---|---|---|
| 2,860,125 | 11/1958 | Lanning | 260—93.7 |
| 2,930,784 | 3/1960 | Hanson et al. | 260—94.9 |
| 3,141,009 | 7/1964 | Shuman | 260—88.2 |

JOSEPH L. SCHOFER, Primary Examiner

W. F. HAMROCK, Assistant Examiner

U.S. Cl. X.R.

260—85.1, 94.9 F, 96 R

PO-1050
(5/69)

UNITED STATES PATENT OFFICE
CERTIFICATE OF CORRECTION

Patent No. 3,635,932        Dated   January 18, 1972

Inventor(s)   Norman F. Keckler

It is certified that error appears in the above-identified patent and that said Letters Patent are hereby corrected as shown below:

Col. 4, line 42, "Hexane" should read --Pentane-- and

"Pentane" should read --Hexane--

Line 51 should read as follows:

--solutions did not produce a low rating, whereas when pen- --

Signed and sealed this 6th day of June 1972.

(SEAL)
Attest:

EDWARD M. FLETCHER, JR.
Attesting Officer

ROBERT GOTTSCHALK
Commissioner of Patents